United States Patent
Yoshioka et al.

(10) Patent No.: US 6,720,974 B2
(45) Date of Patent: Apr. 13, 2004

(54) ARITHMETIC UNIT AND ARITHMETIC PROCESSING METHOD

(75) Inventors: Shigeatsu Yoshioka, Kanagawa (JP); Hiroyuki Ozawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 227 days.

(21) Appl. No.: 10/067,946

(22) Filed: Feb. 8, 2002

(65) Prior Publication Data

US 2002/0118213 A1 Aug. 29, 2002

(30) Foreign Application Priority Data

Feb. 14, 2001 (JP) .................................. 2001-037458

(51) Int. Cl.[7] ................................................ G09G 5/00
(52) U.S. Cl. ...................... 345/610; 345/522; 345/643
(58) Field of Search ................................ 345/606, 147, 345/150, 418–419, 429–431, 424–426, 589, 520, 600, 501–506, 530–538

(56) References Cited

U.S. PATENT DOCUMENTS

| | | | |
|---|---|---|---|
| 4,709,231 A | | 11/1987 | Sakaibara et al. |
| 5,253,339 A | | 10/1993 | Wells et al. |
| 5,361,386 A | | 11/1994 | Watkins et al. |
| 5,659,671 A | | 8/1997 | Tannenbaum et al. |
| 5,745,118 A | * | 4/1998 | Alcorn et al. ............... 345/587 |
| 6,204,857 B1 | * | 3/2001 | Piazza et al. ............... 345/582 |
| 6,532,017 B1 | * | 3/2003 | Peet et al. .................. 345/506 |

FOREIGN PATENT DOCUMENTS

EP 0 782 105 7/1997

OTHER PUBLICATIONS

Pedram, Massoud; "Tutorial and Survey Paper, Power Minimization in IC Design: Principles and Applications"; ACM Transactions on Design Automation of Electronic Systems, vol. 1, No. 1, Jan. 1996, pp. 3–56.*

M. R. Kappel, Computer–Aided Design, vol. 27, No. 8, pp. 595–603, XP–004022769, "Shading: Fitting a Smooth Intensity Surface", Aug. 1, 1995.

J. Bao, et al., Computers & Graphics, vol. 17, No. 2, pp. 137–145, XP–000546529, "Shading Models for Linear and Area Light Sources", Mar. 1, 1993.

* cited by examiner

*Primary Examiner*—Joseph Mancuso
*Assistant Examiner*—Alysa Brautigam
(74) *Attorney, Agent, or Firm*—Oblon, Spivak, McClelland, Maier & Neustadt, P.C.

(57) ABSTRACT

Disclosed are an arithmetic unit and an arithmetic processing method. In the arithmetic unit, in linear interpolation of a parameter of a pixel to be used to plot an object in a three-dimensional video, an operation result value can be fixed in response to a particular gradient value of the parameter and power consumption arising from charging and discharging through a clock wiring line can be reduced. The arithmetic unit includes an arithmetic operation element for linearly interpolating a parameter of a pixel in a triangle based on coordinate values of a vertex of the triangle and gradient values of the parameters in X and Y directions, a clock supply element for supplying a clock signal to the arithmetic operation element, a detection element for detecting a particular gradient value of the parameter in the X direction or/and the Y direction, and a control element for controlling the clock supply element in response to a gradient value of the parameter detection signal received from the detection element. The control element stops the clock signal when "0" is detected as the gradient value of the parameter in the X direction or/and as the gradient value of the parameter in the Y direction and within a period within which such "0" continues to be detected.

10 Claims, 11 Drawing Sheets

ARITHMETIC UNIT AND ARITHMETIC PROCESSING METHOD

BACKGROUND OF THE INVENTION

This invention relates to an arithmetic unit and an arithmetic processing method suitable for use with a portable telephone set with a video game function wherein an arbitrary game character is plotted as a three-dimensional video or a like apparatus.

In recent years, use of a portable telephone unit having an information search function or a video game function in addition to a telephone function has been and is progressively increasing in the field of communication processing. Meanwhile, in the field of computer graphics processing, plotting of an object in a three-dimensional video has been and is increasing. Usually, a three-dimensional video is represented using triangles. This is because a triangle allows a parameter such as a color value (P(X, Y)) of a pixel therein can be represented in such a simple expression as given below:

$$P(X,Y)=dP/dX(X-X_0)+dP/dY(Y-Y_0)+P_0$$

This arises from the fact that with use of a gradient in the X direction and a gradient in the Y direction of a parameter with respect to a start point given by a certain vertex (coordinates: $X_0, Y_0$, parameter $P_0$) of a triangle, a parameter of a pixel in the inside of the triangle can be linearly interpolated. As a parameter for a pixel, many parameters including color (R, G, B, A) values, a Z value, texture coordinates (S, T, Q) and a FOG coefficient are available. Usually, such parameters as mentioned above are subjected to interpolation operation in response to a clock signal and calculated in parallel to each other by arithmetic units independent of each other in order to achieve high speed operation.

The texture coordinates (S, T, Q) are composed of homogeneous coordinates (S, T) and a homogeneous term Q of the texture data. The homogenous term Q is, in short, a parameter like a scaling factor, and coordinates of the UV coordinate system of the actual texture buffer, that is, the texture coordinate data (U, V), are values obtained by multiplying "S/Q" and "T/Q", which are quotients by division of the homogeneous coordinates (S, T) by the homogeneous term Q, by the texture sizes USIZE and VSIZE, respectively. For example, perspective correct texture mapping can be performed by linearly interpolating the homogeneous term Q.

However, in a conventional desk-top personal computer, stationary game machine and so forth of the commercial power supply driven type, in order to plot an arbitrary object in a three-dimensional video, even where some parameter or parameters are not used, a clock signal is supplied continuously to the arithmetic unit to perform linear interpolation operation of the parameters of pixels.

However, if such a clock supplying system as just described is applied as it is to a mobile personal computer, a PDA (Personal Digital Assistant), a portable game machine or the like of the battery driven type, then even where some parameter or parameters is/are not used, linear interpolation operation for the parameter or parameters is performed.

Particularly when the circuit configuration is such that a plurality of pixels are scanned at a time by parallel arithmetic units, since the number of opportunities of charging and discharging by a clock wiring line is great as much, power is consumed wastefully and the battery may be used up in a short time. Further, in order to suppress heat generation of a circuit board on which ICs are mounted, an air-cooling fan must be provided in the potable terminal equipment mentioned above.

SUMMARY OF THE INVENTION

It is an object of the present invention to provide an arithmetic unit and an arithmetic processing method wherein, when a parameter for a pixel to be used to plot an arbitrary object in a three-dimensional video is to be linearly interpolated, an operation result value can be fixed in accordance with a gradient value of the parameter.

It is another object of the present invention to provide an arithmetic unit and an arithmetic processing method wherein power consumption arising from charging and discharging through a clock wiring line can be reduced.

In order to attain the objects described above, according to an aspect of the present invention, there is provided an arithmetic unit for linearly interpolating a parameter of a pixel to be used to plot an arbitrary object in a three-dimensional video based on coordinate values of a vertex of a polygon and gradient values of the parameters in an X direction and a Y direction, comprising arithmetic operation means for linearly interpolating a parameter of a pixel in a polygon based on coordinate values of a vertex of the polygon, a gradient value of the parameter in an X direction and a gradient value of the parameter in a Y direction, clock supply means for supplying a clock signal to the arithmetic operation means, detection means for detecting a particular gradient value of the parameter in the X direction or/and the Y direction to produce a parameter gradient value detection signal, and control means for receiving the parameter gradient value detection signal from the detection means and controlling the clock supply means in response to the parameter gradient value detection signal.

In the arithmetic unit, when a parameter of a pixel to be used to plot an arbitrary object in a three-dimensional video is to be linearly interpolated based on coordinate values of a vertex of a polygon and gradient values of the parameters in an X direction and a Y direction, the clock signal is supplied from the clock supply means to the arithmetic operation means through the control means. The arithmetic operation means linearly interpolates the parameter of the pixel in the polygon based on the coordinate values of the vertex of the polygon, the gradient value of the parameter in the X direction and the gradient value of the parameter in the Y direction.

Meanwhile, the detection means detects a particular gradient value of the parameter in the X direction or/and the Y direction to produce a parameter gradient value detection signal. The parameter gradient value detection signal is outputted from the detection means to the control means. The control means receives the parameter gradient value detection signal from the detection means and controls the clock supply means in response to the parameter gradient value detection signal.

For example, when such a particular gradient value of the parameter as the gradient value of the parameter in the X direction of "0" and/or the gradient value of the parameter in the Y direction of "0" is detected and within a period within which such a value continues to be detected, the clock signal to be supplied to the arithmetic operation means is stopped.

Accordingly, the arithmetic unit can perform such output control that, when such a particular gradient value of the parameter as the gradient value of the parameter in the X direction of "0" and/or the gradient value of the parameter in the Y direction of "0" is detected and within a period within which such a value continues to be detected, the clock signal to be supplied to the arithmetic means is stopped and the calculation output value is fixed.

Further, since the power consumption by charging and discharging of a clock wiring line can be reduced when the gradient value of the parameter in the X direction of "0" and/or the gradient value of the parameter in the Y direction of "0" is detected and within a period within which the values continue to be detected, also heat generation of an IC chip in which the arithmetic unit is incorporated can be reduced. Consequently, the arithmetic unit can be applied sufficiently to an image processing apparatus of the battery driven type. Besides, such a part as a fan can be eliminated or a part of a lower quality can be used, and a less expensive IC package can be used. Therefore, the arithmetic unit contributes very much to reduction in price of the product.

According to another aspect of the present invention, there is provided an arithmetic processing method wherein a parameter of a pixel to be used to plot an arbitrary object in a three-dimensional video is calculated by linear interpolation calculation based on coordinate values of a vertex of a polygon, a gradient value of the parameter in an X direction, a gradient value of the parameter in a Y direction and a clock signal, comprising the steps of detecting a particular gradient value of the parameter in the X direction or/and the Y direction, and stopping, when the particular gradient value of the parameter is detected, supply of the clock signal thereby to fix an output value relating to the linear interpolation calculation.

With the arithmetic processing method, when such a particular gradient value of the parameter as the gradient value of the parameter in the X direction of "0" and/or the gradient value of the parameter in the Y direction of "0" is detected and within a period within which such a value continues to be detected, the power consumption by charging and discharging of a clock wiring line can be reduced.

In this manner, the present invention can be applied suitably to a portable telephone set or a like apparatus having a video game function of plotting an arbitrary game character in a three-dimensional video.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 1:
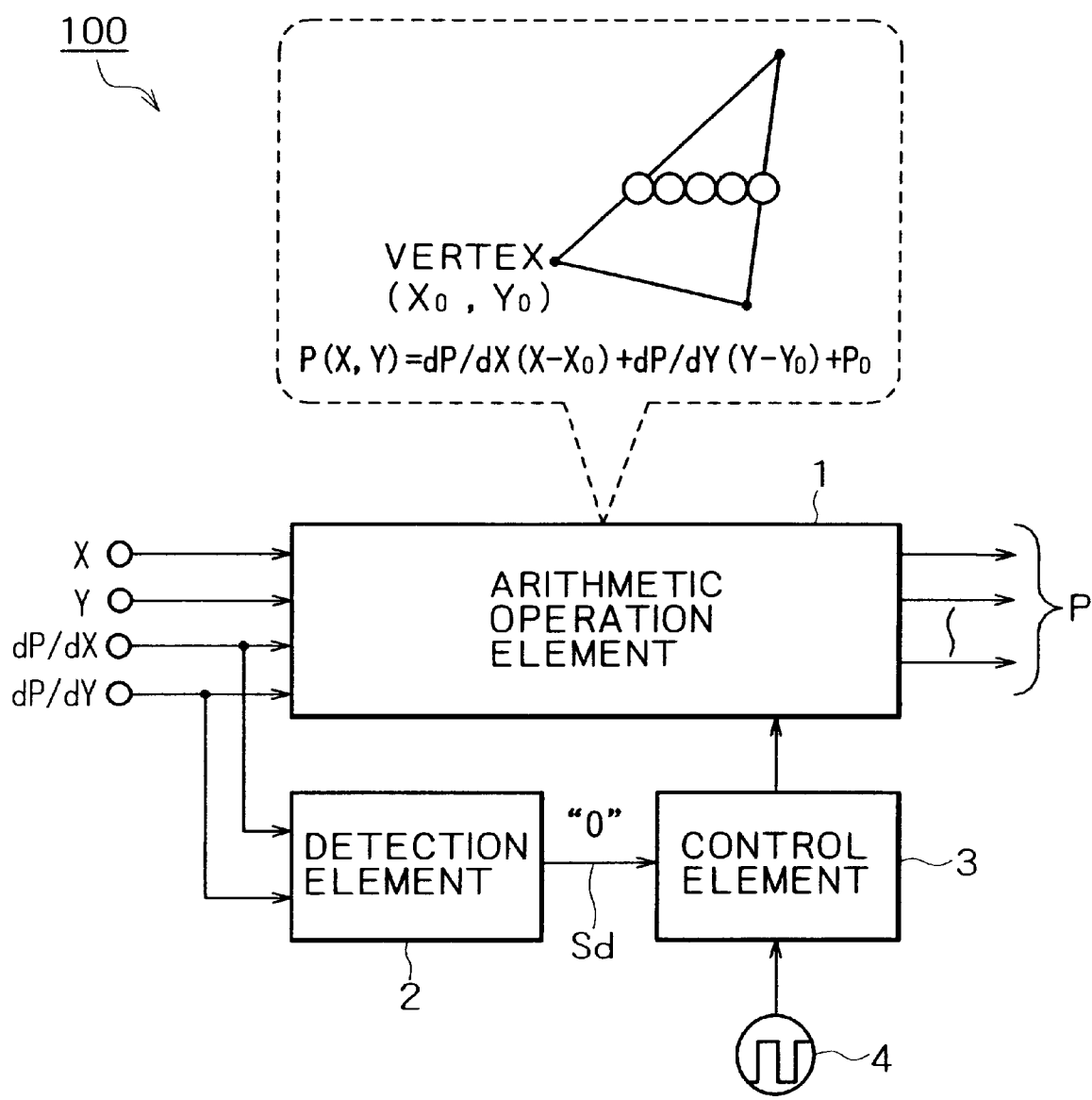
FIG. 1 is a block diagram showing an example of a configuration of an arithmetic unit to which the present invention is applied.

Referring first to FIG. 1, there is shown an example of a configuration of an arithmetic unit to which the present invention is applied.

The arithmetic unit is generally denoted by 100 and includes a control element for controlling, in order to linearly interpolate a parameter of a pixel to be used to plot an arbitrary object in a three-dimensional video based on coordinate values of a vertex of a polygon and gradient values of the parameters in an X direction and a Y direction, supply of a clock signal in response to a particular parameter gradient value detection signal. 6Thus, the arithmetic unit 100 can stop supply of the clock signal to fix a calculation output value when the gradient value "0" of the parameter in the X direction and/or the parameter gradient "0" of the parameter in the Y direction are detected and within a period within which such values are detected, and can reduce the power consumption caused by charging and discharging of a clock wiring line.

Thus, the arithmetic unit 100 shown in FIG. 1 is an apparatus for linearly interpolating a parameter of a pixel to be used to plot an arbitrary object in a three-dimensional video based on coordinate values of a vertex of a polygon and gradient values of the parameters in the X direction and the Y direction. To this end, the arithmetic unit 100 includes an arithmetic operation element 1 which receives coordinate values (X, Y) of a polygon, a gradient value of the parameter in the X direction and a gradient value of the parameter in the Y direction as inputs thereto and linearly interpolates a parameter of a pixel in the polygon in accordance with the following expression (1):

$$P(X,Y)=dP/dX(X-X_0)+dP/dY(Y-Y_0)+P_0 \quad (1)$$

where P(X, Y) is the parameter of a pixel to be used to plot a three-dimensional video, $X_0$ and $Y_0$ are coordinate values of a vertex of the polygon, $P_0$ is the parameter value at the point of the vertex, dP/dX is the gradient value of the parameter in the X direction on the polygon, and dP/dY is the gradient value of the parameter in the Y direction on the polygon.

Further, where the parameter of a pixel in the polygon is represented by Pn and the variation amount of the parameter when X increases by a certain fixed amount is represented by dPx while the variation amount of the parameter when Y increases by a certain fixed amount is represented by dPy, the arithmetic operation element 1 successively calculates:

$$Pn+1=Pn+dPx \quad (2)$$

for the X direction and $$P_{n+1} = P_n + dPy \qquad (3)$$

for the Y direction to linearly interpolate the parameters of the pixels in the polygon. Here, since also both of dPx and dPy represent gradients of the parameter, they are gradient values of the parameters. Particularly where the variation amount of X is 1, dPx=dP/dX, and where the variation amount of Y is 1, dPy=dP/dY.

A control element 3 is connected to the arithmetic operation element 1, and a detection element 2 and a clock supply element 4 are connected to the control element 3. The detection element 2 detects a particular gradient value dPx of the parameter in the X direction or/and a gradient value dPy of the parameter in the Y direction inputted to the arithmetic operation element 1 and outputs a parameter gradient value detection signal Sd, for example, of the low level to the control element 3.

The clock supply element 4 supplies a clock signal CLK to the arithmetic operation element 1 through the control element 3. The control element 3 receives the parameter gradient value detection signal Sd from the detection element 2 as an input thereto and controls the clock supply element 4. For example, when the gradient value dPx=0 of the parameter is detected as the particular gradient value of the parameter in the X direction and/or the gradient value dPy=0 of the parameter is detected as the particular gradient value of the parameter in the Y direction, and within a period within which such values are detected, the control element 3 stops the supply of the clock signal CLK to the arithmetic operation element 1 thereby to fix an output value of the arithmetic operation element 1.

Figure 2:
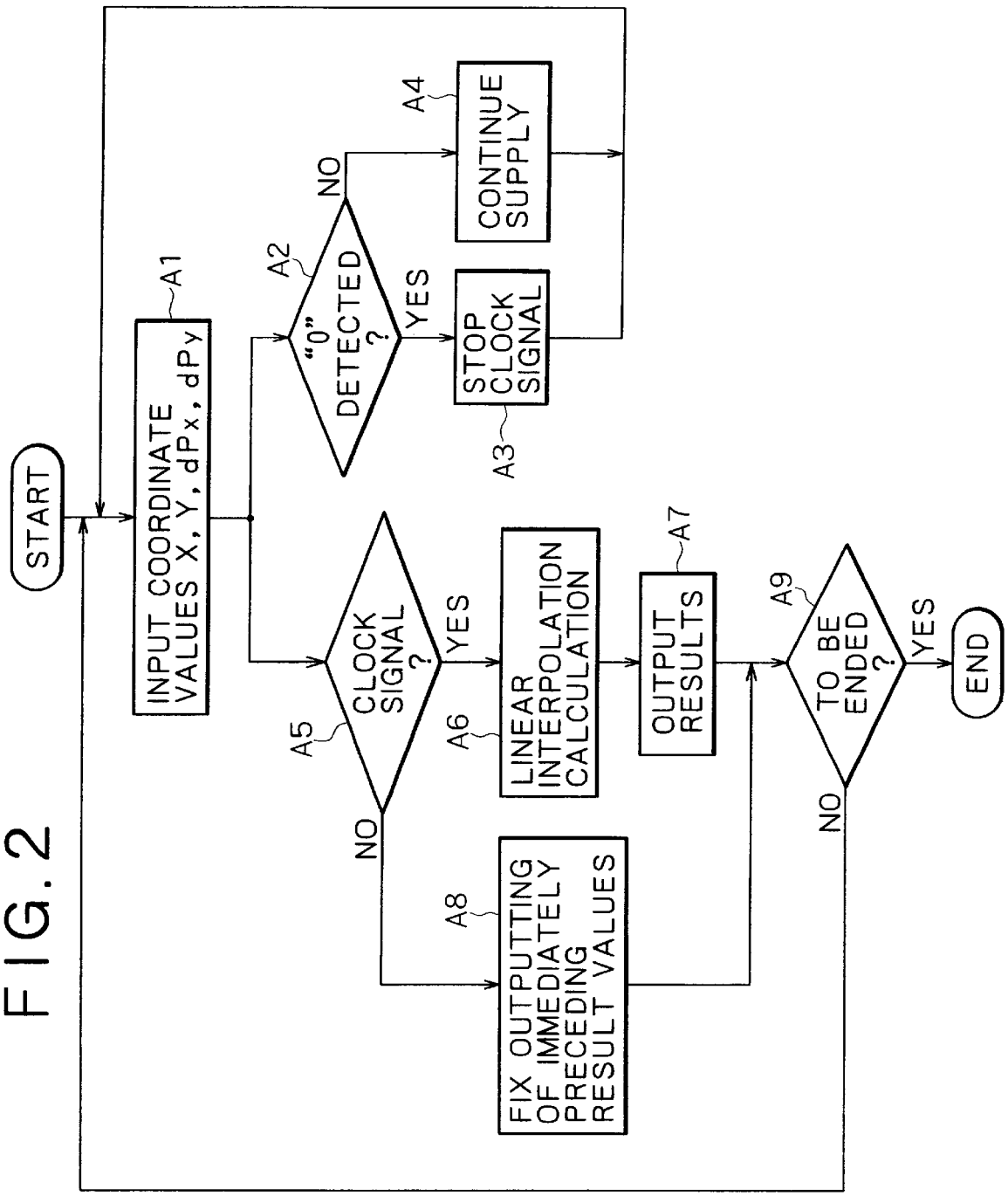
FIG. 2 is a flow chart illustrating an example of processing of the arithmetic unit of FIG. 1.

Now, an arithmetic processing method to which the present invention is applied is described in connection with an example of processing of the arithmetic unit 100. The processing is illustrated in FIG. 2. It is premised here that the arithmetic unit 100 calculates a parameter of a pixel to be used to plot an arbitrary object in a three-dimensional video based on the coordinate values of a vertex of a polygon, the gradient value dPx of the parameter in the X direction, the gradient value dPy of the parameter in the Y direction and the clock signal CLK. Naturally, it is presumed that, in an initial stage, the clock signal CLK is supplied to the arithmetic operation element 1.

Referring to FIG. 2, first in step A1, the coordinate values (X, Y) of a vertex of a polygon, the gradient value dPx of the parameter in the X direction and the gradient value dPy of the parameter in the Y direction are inputted to the arithmetic operation element 1. Thereafter, the processing is divided into a calculation flow and a clock control flow. In step A2, the arithmetic operation element 1 detects a particular gradient value of the parameter in the X direction or/and the Y direction.

Here, if the gradient value of the parameter dPx=0 is detected as the particular gradient value of the parameter in the X direction or/and the gradient value dPy=0 of the parameter is detected as the particular gradient value of the parameter in the Y direction, then the processing advances to step A3, in which the control element 3 stops supply of the clock signal CLK. However, if the gradient value dPx=0 or/and dPy=0 of the parameter is not detected, then the control element 3 continues the supply of the clock signal CLK to the arithmetic operation element 1 in step A4.

On the other hand, the arithmetic operation element 1 performs calculation processing based on whether or not the clock signal CLK is present in step A5. If the clock signal CLK is supplied to the arithmetic operation element 1 (Yes in step A5), then the arithmetic operation element 1 executes linear interpolation processing based on the expressions (1) to (3) given hereinabove in step A6. Then in step A7, the arithmetic operation element 1 outputs a resulting value of the linear interpolation processing. On the other hand, if it is discriminated in step A5 that the clock signal CLK is not supplied to the arithmetic operation element 1 (No in step A5), then the arithmetic operation element 1 is fixed in step A8 so that it thereafter outputs a resulting value of the linear interpolation processing which has been outputted immediately before the supply of the clock signal CLK is stopped.

In this manner, the arithmetic unit 100 to which the present invention is applied can perform such output control that, where a parameter of a pixel to be used to plot an arbitrary object in a three-dimensional video is to be linearly interpolated based on the coordinate values X, Y of a vertex of a polygon and the gradient values dPx and dPy of the parameters in the X direction and the Y direction, supply of the clock signal CLK is stopped thereby to fix a resulting value of the linear interpolation calculation when such a particular gradient value of the parameter as the gradient value dPx of the parameter in the X direction of "0" or/and the gradient value of the parameter dPy in the Y direction of "0" are detected and within a period within which such a value is detected.

Further, when the gradient value of the parameter in the X direction of "0" and/or the gradient value of the parameter in the Y direction of "0" are detected and within a period within which such values are detected, power consumption by charging and discharging of a clock wiring line can be reduced. Consequently, also heat generation of an IC chip in which the arithmetic unit 100 (a graphics system) is incorporated is reduced. Consequently, the arithmetic unit 100 can be applied sufficiently to an image processing apparatus of the battery driven type. Besides, such a part as a fan can be eliminated or a part of a lower quality can be used, and besides a less expensive IC package can be used. Consequently, the price of a product in which the arithmetic unit 100 is incorporated can be reduced as much.

Figure 3:
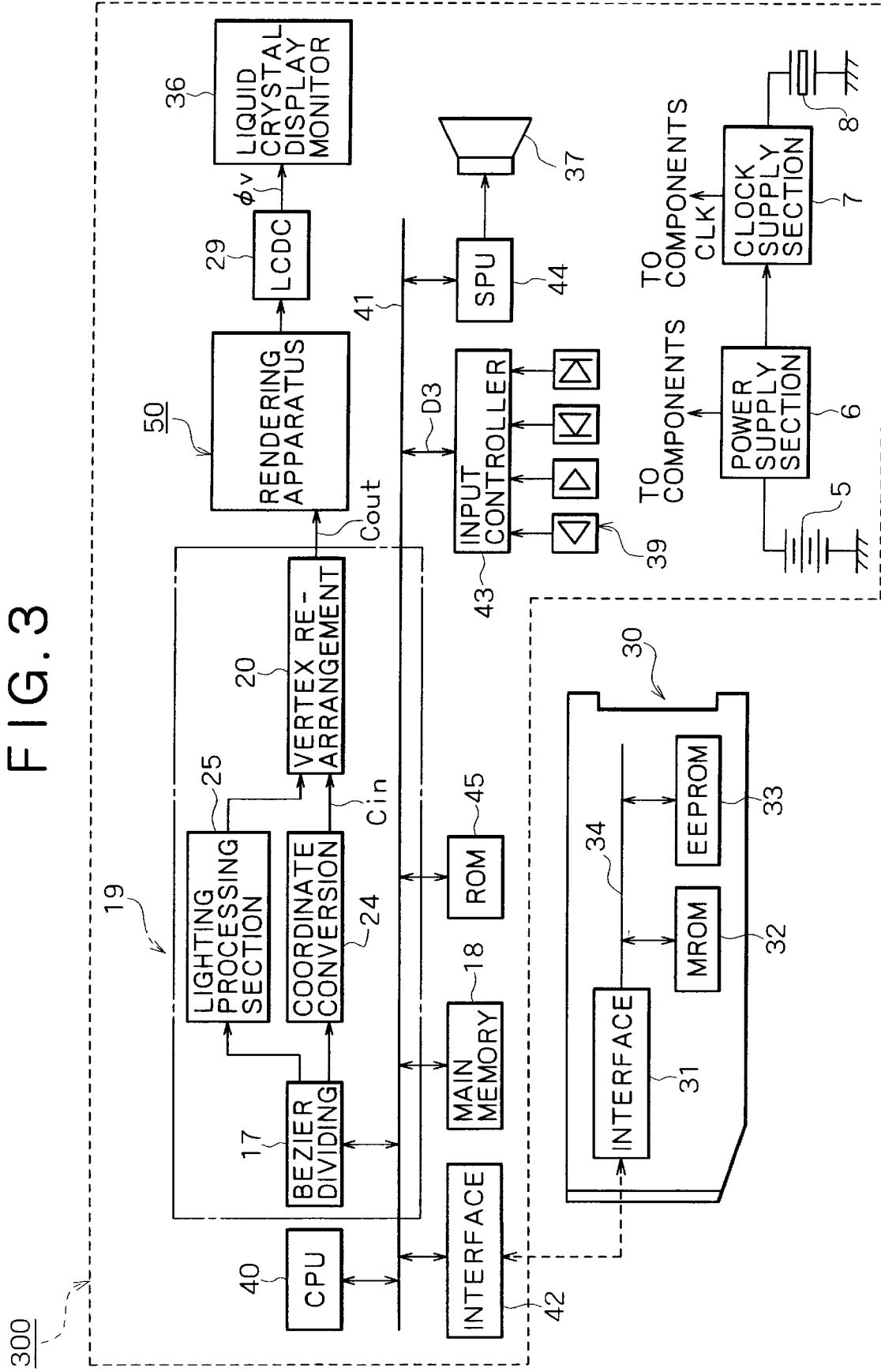
FIG. 3 is a block diagram of a portable terminal unit as an image processing apparatus to which the present invention is applied.
Figure 4:
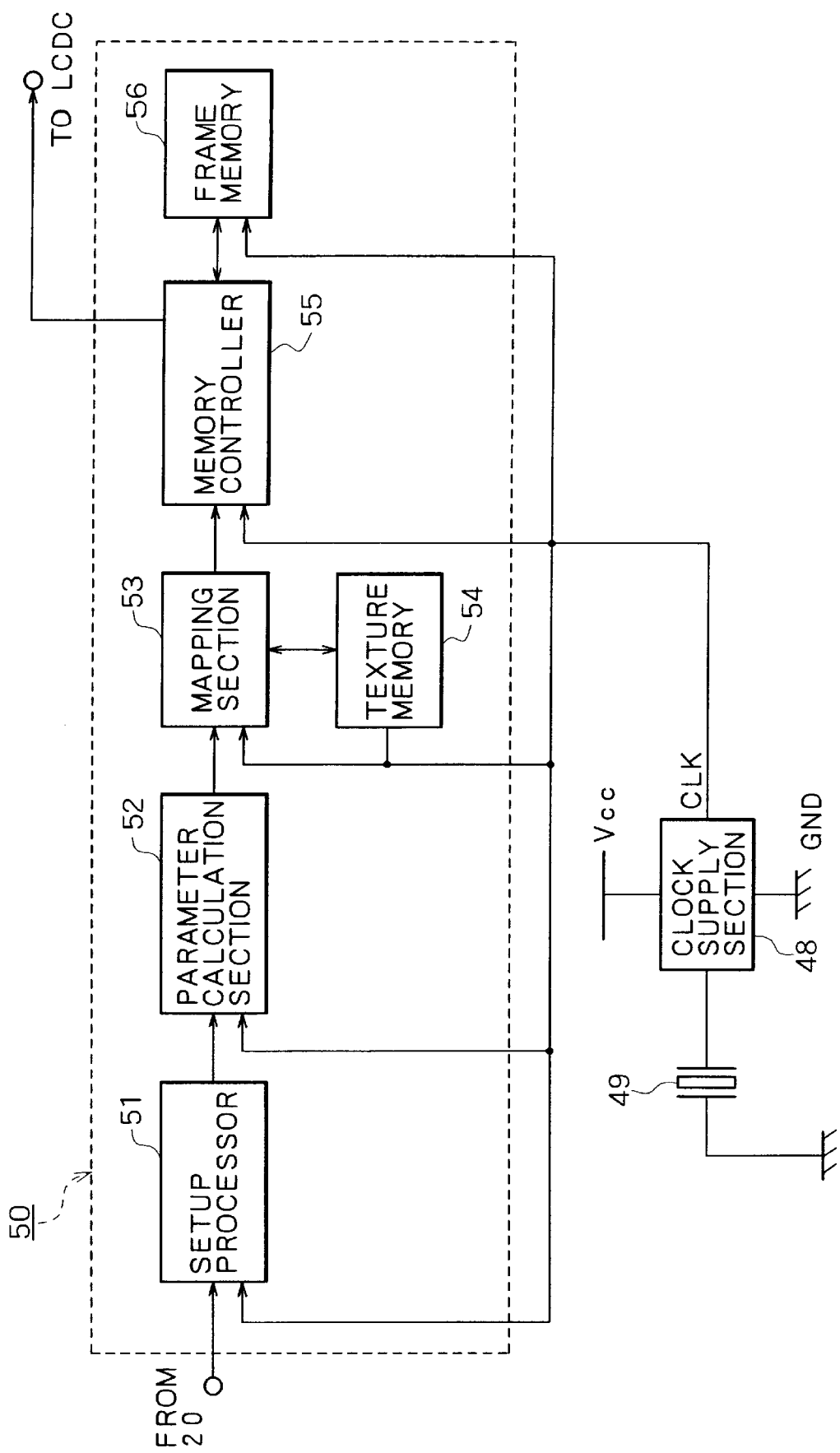
FIG. 4 is a block diagram showing an example of an internal configuration of a rendering apparatus of the portable terminal apparatus of FIG. 3.

FIG. 3 shows an example of a configuration of a portable terminal equipment as a form of an image processing apparatus to which the present invention is applied, and FIG. 4 shows an example of an internal configuration of a rendering apparatus of the portable terminal equipment of FIG. 3.

Referring first to FIG. 3, the portable terminal equipment as an example of an image processing apparatus is generally denoted at 300 and incorporates the arithmetic unit 100 described hereinabove. In FIG. 3, the portable terminal equipment 300 is surrounded by a broken line, and a memory cartridge 30 in which a game application is stored is loaded into and used together with the portable terminal equipment 300.

The portable terminal equipment 300 is driven by a battery 5. A power supply section 6 is connected to the battery 5 and supplies dc power to components of the portable terminal equipment 300. A clock supply section 7 is connected to the power supply section 6 and cooperates with a quartz oscillator 8 to generate a clock signal CLK of a predetermined frequency. The clock signal CLK is supplied to the components of the portable terminal equipment 300.

A game video is worked in accordance with an external operation by the portable terminal equipment 300. Thereupon, the portable terminal equipment 300 linearly interpolates a parameter of a pixel to be used to plot a game image in a three-dimensional video based on coordinate values of a vertex of a polygon and gradient values of the parameters in the X and Y direction. The parameter of an image may be any of a great number of parameters including color (R, G, B, A) values, a Z value, texture coordinates (S, T, Q) and a FOG coefficient.

The texture coordinates (S, T, Q) are composed of homogeneous coordinates (S, T) and a homogeneous term Q of the texture data. The homogenous term Q is, in short, a parameter like a scaling factor, and coordinates of the UV coordinate system of the actual texture buffer, that is, the texture coordinate data (U, V), are values obtained by multiplying "S/Q" and "T/Q", which are quotients by division of the homogeneous coordinates (S, T) by the homogeneous term Q, by the texture sizes USIZE and VSIZE, respectively. For example, perspective correct texture mapping can be performed by linearly interpolating the homogeneous term Q.

Referring to FIG. 3, the portable terminal equipment 300 includes a bus 41. A main memory 18, a geometry calculation section 19, a CPU (Central Processing Unit) 40, an input controller 43, a sound process unit (SPU) 44, a ROM (Read Only Memory) 45 and so forth are connected to the bus 41. The geometry calculation section 19 includes a Bezier dividing apparatus 17, a vertex re-arrangement apparatus 20, a coordinate conversion section 24 and a lighting processing section 25.

The Bezier dividing apparatus 17 performs image processing of an nth order curved surface figure based on coordinate values of a control point read out from the main memory 18. The Bezier dividing apparatus 17 includes a floating point linear interpolator and successively calculates X(1−t)+Yt for coordinate values of a new control point with which such control points are divided internally, for example, based on the coordinate values X, Y of a control point of 23-bit width and an interpolation coefficient t of 8-bit width which has a value within the range of 0≦t≦1. A control procedure for the calculation is described in the ROM 45 and read out by the CPU 40 when the application is executed.

The coordinate conversion section 24 and the lighting processing section 25 are connected to the Bezier dividing apparatus 17. The coordinate conversion section 24 converts the coordinate values X, Y of a vertex into coordinate values of a screen coordinate (video display) system in accordance with a polygon plotting instruction. Vertex information Cin has a length of 76 bytes and forms configuration data of one polygon (refer to FIG. 9).

A parallel arithmetic unit such as a geometry transfer engine (GTE) is used for the coordinate conversion section 24 and performs coordinate conversion or calculation processing for a matrix or a vector in response to a calculation request from the CPU 40 at a high speed. Where the parallel arithmetic unit is used for calculation, for example, for flat shading wherein one triangular polygon is plotted with the same color, coordinate calculation of approximately 1,500,000 polygons for one second in the maximum can be performed. This reduces the load to the CPU 40 and allows high speed coordinate calculation to be performed by the portable terminal equipment 300.

The lighting processing section 25 arithmetically operates, in accordance with a calculation request from the CPU 40, an inner product (cos θ) between a normal line vector of a vertex obtained by outer product calculation of coordinates of the vertex and a light source vector set in advance to calculate a color of light.

The vertex re-arrangement apparatus 20 is connected to the coordinate conversion section 24 and the lighting processing section 25 and includes a memory, for example, for 2 lines for storing vertex information Cin. A graphic processing unit (GPU) or a like unit is used for the vertex re-arrangement apparatus 20 and performs vertex re-arrangement in accordance with a plotting instruction from the CPU 40. The vertex re-arrangement apparatus 20 successively writes m pieces of vertex information Cin after coordinate conversion into a memory area for the first line and writes next m pieces of vertex information Cin into another memory area for the second line. Thereafter, the vertex re-arrangement apparatus 20 successively reads out 2(m−1) pieces of triangle information Cout obtained by obliquely dividing m−1 quadrangles each defined by two pieces of the vertex information Cin which are adjacent each other in the first line and two pieces of the vertex information Cin which are adjacent each other in the second line.

A rendering apparatus 50 which is a kind of arithmetic unit is connected to the vertex re-arrangement apparatus 20 and linearly interpolates a parameter of a pixel to be used to plot a game image in a three-dimensional video based on the coordinate values X, Y of a vertex of a polygon and the gradient values dPx and dPy of the parameters in the X and Y directions (rasterizing processing).

Referring to FIG. 4, the rendering apparatus 50 includes a setup processor 51, a parameter calculation section 52, a mapping section 53, a texture memory 54, a memory controller 55 and a frame memory 56, and decides the color in a polygon by interpolation from a color of a vertex of a polygon (gouraud shading processing).

The setup processor 51 sets coordinate values (X, Y) of a vertex of a polygon necessary for parameter calculation or calculates the gradient value dPx of the parameter in the X direction and the gradient value dPy of the parameter in the Y direction in response to the clock signal CLK. Further, the setup processor 51 calculates the color texture coordinates (S, T, Q) of one pixel.

Figure 5:
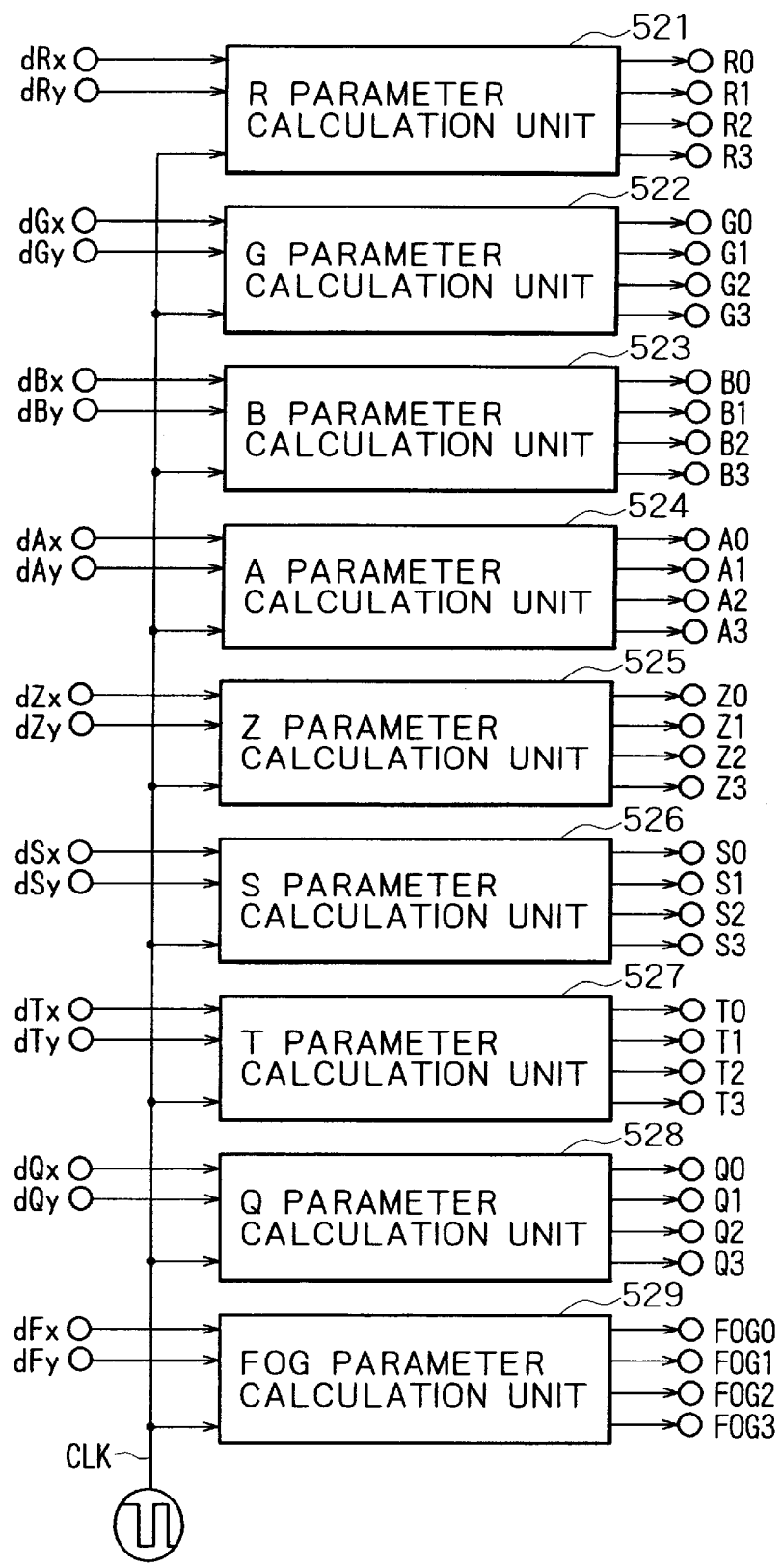
FIG. 5 is a block diagram showing an example of an internal configuration of a parameter calculation section of the rendering apparatus of FIG. 4.

The parameter calculation section (digital differential analyzer: DDA) 52 is connected to the setup processor 51 and performs linear interpolation for a parameter of a pixel in a polygon in accordance with the expressions (2) and (3) given hereinabove in response to the clock signal CLK. The parameter calculation section 52 includes, for example, such nine parameter calculation units 521 to 529 as shown in FIG. 5. The parameter calculation units 521 to 529 are an example of unit calculation units and are provided for different parameters of a pixel.

Figure 6:
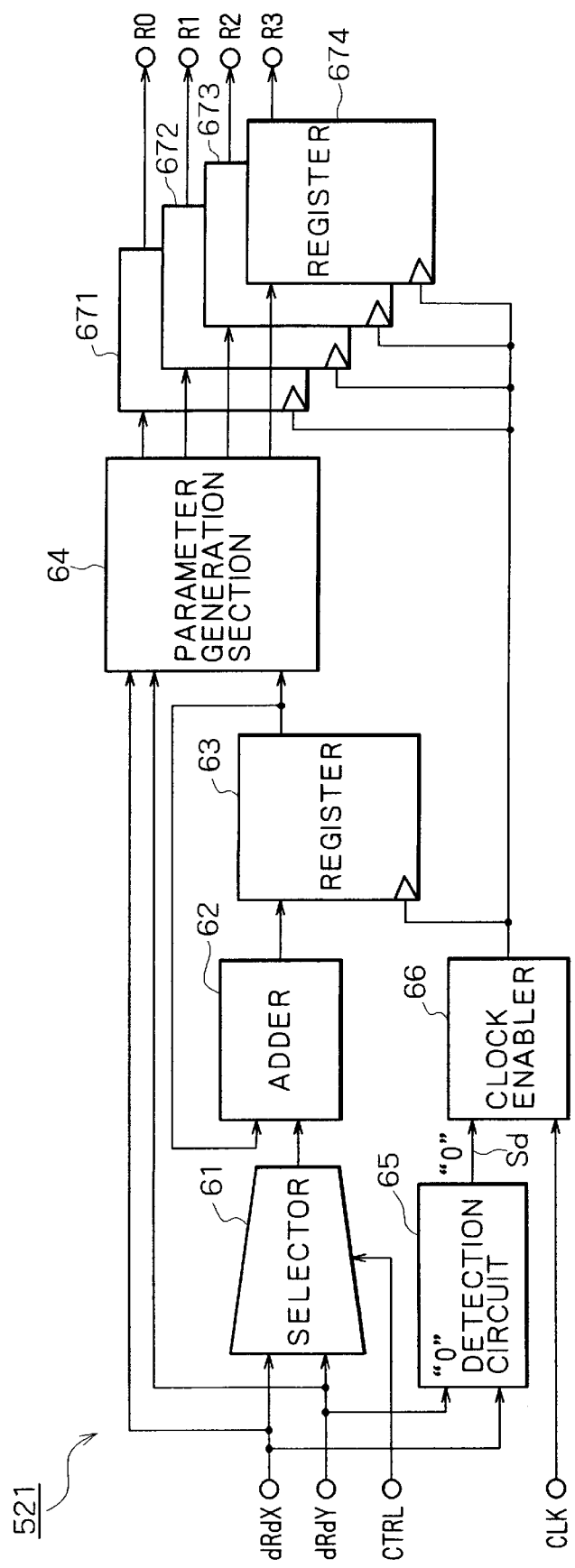
FIG. 6 is a block diagram showing an example of an internal configuration of an R parameter calculation unit of the parameter calculation section of FIG. 5.

The R parameter calculation unit 521 includes, for example, a selector 61, an adder 62, a register 63, a parameter generation section 64, a "0" detection circuit 65, a clock enabler 66 and four registers 671 to 674 as shown in FIG. 6. The R parameter calculation unit 521 receives the clock signal CLK supplied thereto, performs linear interpolation regarding the color value (red) R in accordance with the expression (3) given hereinabove and outputs red interpolation values R0, R1, R2 and R3 of 4 bits.

Referring to FIG. 6, the selector 61 selects one of the gradient value dPx of n bits of the parameter in the X direction and the gradient value dPy of n bits of the parameter in the Y direction regarding the color value R in accordance with an XY scan control signal CTRL. The XY scan control signal CTRL has the low level when scanning in the X direction is performed but has the high level when scanning in the Y direction is performed. The adder 62 which forms arithmetic operation means is connected to the selector 61 and calculates in accordance with the expression (3) given hereinabove.

The register 63 is connected to the adder 62 and stores (accumulates) a result of addition by the adder 62 in response to the clock signal CLK. The parameter generation section 64 which forms the arithmetic operation means is connected to the register 63, and performs linear interpolation in accordance with the expression (3) given hereinabove based on the gradient value dPx of the parameter in the X direction, the gradient value dPy of the parameter in the Y direction and a result of the addition from the parameter generation section 64 and outputs red interpolation values R0, R1, R2 and R3 of 4 bits.

The registers 671 to 674 are connected to the parameter generation section 64, and the register 671 holds the red interpolation value R0 in response to the clock signal CLK. The register 672 holds the red interpolation value R1 in response to the clock signal CLK. The register 673 holds the red interpolation value R2 in response to the clock signal CLK. The register 674 holds the red interpolation value R3 in response to the clock signal CLK.

Figure 7:
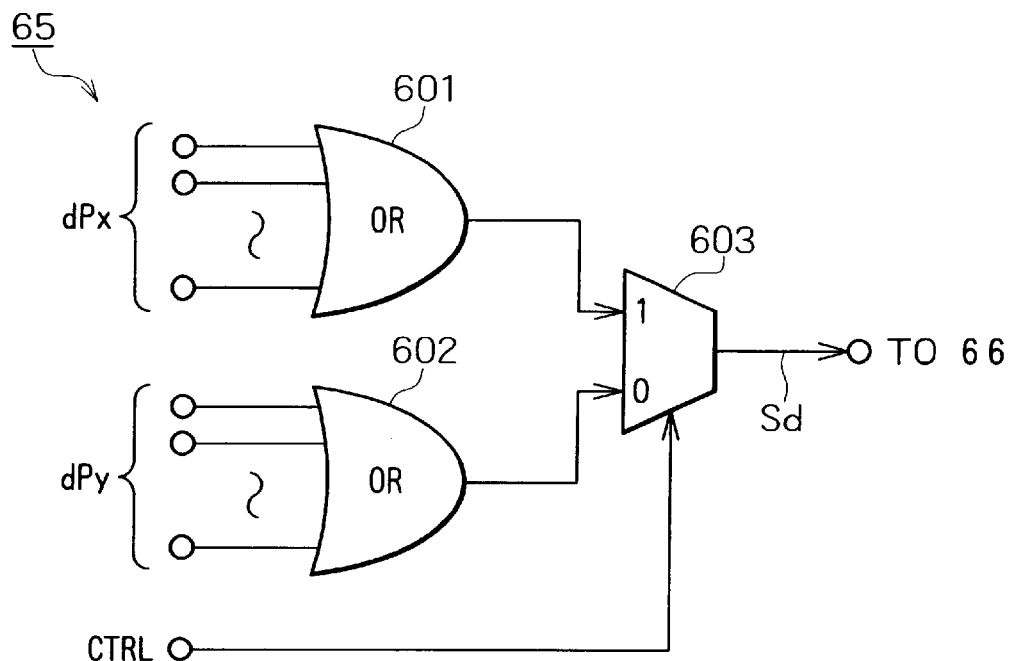
FIG. 7 is a logic circuit diagram showing an example of a configuration of a "0" detection circuit of the R parameter calculation circuit of FIG. 6.

Meanwhile, the gradient value dPx of the parameter in the X direction and the gradient value dPy of the parameter in the Y direction inputted to the selector 61 are inputted also to the "0" detection circuit 65 which is an example of detection means. The "0" detection circuit 65 includes, for example, as shown in FIG. 7, a pair of n-input OR logic circuits 601 and 602 and a selector 603, and detects a particular gradient value dPx of the parameter in the x direction and the particular gradient value dPy of the parameter in the Y direction.

The n-input OR logic circuit 601 outputs dPx=0 when the gradient value dPx of n bits of the parameter is all "0s". The n-input OR logic circuit 602 outputs dPy=0 when the gradient value dPy of n bits of the parameter is all "0s".

The selector 603 is connected to the n-input OR logic circuits 601 and 602, and selects dPx=0 or dPy=0 in accordance with the XY scan control signal CTRL and generates a parameter gradient value detection signal Sd of the low level within a period within which dPx=0 or dPy=0 is detected.

In particular, when the parameter calculation section 52 is controlled to scan in the X direction or the Y direction in accordance with the XY scan control signal CTRL and the parameter gradient value detection signal Sd is detected and besides the gradient value dPx of the parameter in the X direction is dPx=0 or the gradient value dPy of the parameter in the Y direction is dPy=0, the "0" detection circuit 65 stops supply of the clock signal CLK.

Figure 8:
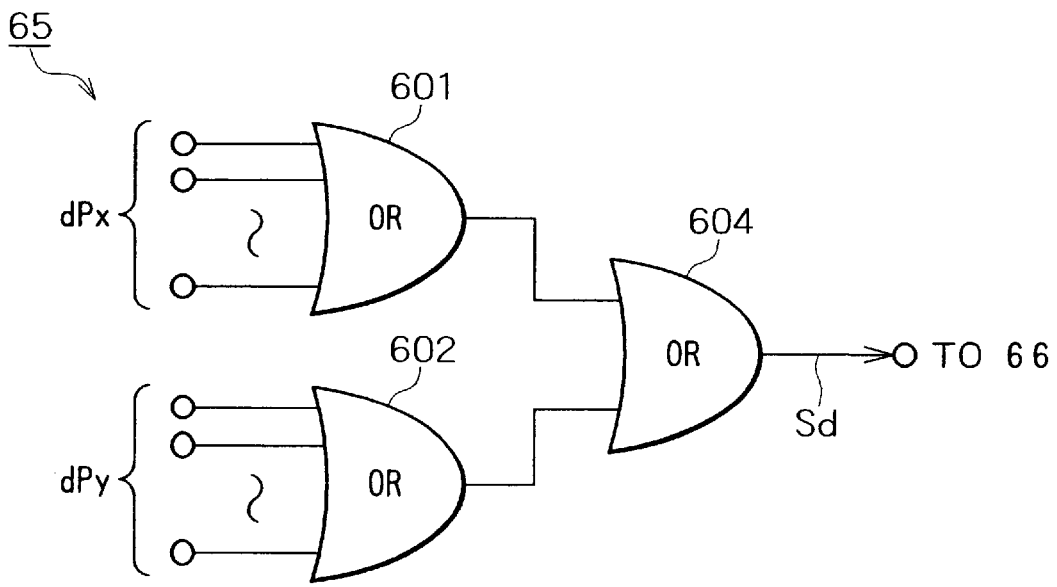
FIG. 8 is a logic circuit diagram showing another example of a configuration of the "0" detection circuit of the R parameter calculation circuit of FIG. 6.

The "0" detection circuit 65 may include such a 2-input OR logic circuit 604 as shown in FIG. 8 in place of the selector 603 shown in FIG. 7. Also in the "0" detection circuit 65 shown in FIG. 8, when the parameter calculation section 52 is controlled to scan in the X direction or the Y direction and the parameter gradient value detection signal Sd is detected and besides the gradient value dPx of the parameter in the X direction is dPx=0 and the gradient value dPy of the parameter in the Y direction is dPy=0, the "0" detection circuit 65 stops supply of the clock signal CLK.

Such a clock enabler 66 as shown in FIG. 6 which is an example of control means is connected to the "0" detection circuit 65 described above and performs supply control of the clock signal CLK in accordance with the parameter gradient value detection signal Sd. The registers 63 and 671 to 674 are connected to the clock enabler 66, and the clock signal CLK is supplied to the registers 63 and 671 to 674.

When the parameter gradient value detection signal Sd of the low level is inputted from the "0" detection circuit 65 to the clock enabler 66, the clock enabler 66 stops supply of the clock signal CLK to the registers 63 and 671 to 674 thereby to fix outputting of an addition result value accumulated in the register 63 and the red interpolation values R0, R1, R2, R3 held in the registers 671 to 674.

Similarly, the G parameter calculation unit 522 shown in FIG. 5 receives supply of the clock signal CLK supplied thereto, performs linear interpolation regarding the color value (green) G in accordance with the expression (3) given hereinabove and outputs green interpolation values G0, G1, G2 and G3 of 4 bits. The B parameter calculation unit 523 receives supply of the clock signal CLK, performs linear interpolation regarding the color value (blue) B in accordance with the expression (3) given hereinabove and outputs blue interpolation values B1, B1, B2 and B3 of 4 bits.

The A parameter calculation unit 524 receives supply of the clock signal CLK, performs linear interpolation regarding the transparency A in accordance with the expression (3), and outputs transparency interpolation values A0, A1, A2 and A3 of 4 bits. The Z parameter calculation unit 525 receives supply of the clock signal CLK, performs linear interpolation regarding the Z value in accordance with the expression (3) given hereinabove and outputs Z value interpolation values Z0, Z1, Z2 and Z3 of 4 bits.

The S parameter calculation unit 526 receives supply of the clock signal CLK, performs linear interpolation regarding the texture coordinate S in accordance with the expression (3) given hereinabove and outputs texture coordinate interpolation values S0, S1, S2 and S3 of 4 bits. The T parameter calculation unit 527 receives supply of the clock signal CLK, performs linear interpolation regarding the texture coordinate T in accordance with the expression (3) given hereinabove and outputs texture coordinate interpolation values T0, T1, T2 and T3 of 4 bits.

The Q parameter calculation unit 528 receives supply of the clock signal CLK, performs linear interpolation regarding the texture coordinate Q in accordance with the expression (3) given hereinabove and outputs Q coordinate interpolation values Q0, Q1, Q2 and Q3 of 4 bits. The FOG parameter calculation unit 529 receives supply of the clock signal CLK, performs linear interpolation regarding the FOG function in accordance with the expression (3) given hereinabove and outputs FOG coefficient interpolation values FOG0, FOG1, FOG2 and FOG3 of 4 bits.

It is to be noted that, since the G parameter calculation unit 522, B parameter calculation unit 523, A parameter calculation unit 524, Z parameter calculation unit 525, S parameter calculation unit 526, T parameter calculation unit 527, Q parameter calculation unit 528 and FOG parameter calculation unit 529 have a similar internal configuration to that of the R parameter calculation unit 521 described above, overlapping description of them is omitted herein to avoid redundancy (refer to FIG. 6).

While, in the portable terminal equipment 300 described above, the gradient value dPx of the parameter is added to a parameter Pn in the preceding cycle in accordance with the expression (3) by the parameter calculation section 52, this is based on the fact that, when the gradient value dPx of the parameter is "0", since the value of the parameter Pn does not vary anyway, supply of the clock signal CLK may be stopped to continue outputting of the parameter Pn of the preceding cycle. Accordingly, supply of the clock signal CLK to the register 63 for holding the output value of the adder (accumulator) 62 is stopped so that the result of the addition between the parameter Pn of the preceding cycle and the gradient value dPx may not be sampled.

The mapping section 53 shown in FIG. 4 is connected to the parameter calculation section 52 having such a configuration as described above such that interpolation calculation results by the nine parameter calculation units 521 to 529 of the parameter calculation section 52 described above may be inputted to the mapping section 53. The texture memory 54 is connected to the mapping section 53 and stores a material (texture) to be inserted (mapped) into a polygon or the like to be coordinate-converted and plotted by the memory controller 55 upon plotting. The mapping section 53 performs texture mapping processing of adhering a texture color stored in the texture memory 54 to a polygon.

The frame memory 56 is connected to the memory controller 55. The memory controller 55 writes display data for one screen of a liquid crystal display monitor 36 from the mapping section 53 into the frame memory 56. For example, the memory controller 55 performs plotting of a polygon according to a game character in the frame memory 56 in accordance with a plotting instruction from the CPU 40. The memory controller 55 can plot approximately 360,000 polygons in one second.

The frame memory 56 is formed from a dual-port RAM and can perform plotting processing from the memory controller 55 and reading out for displaying simultaneously. The frame memory 56 has a capacity of, for example, 1 megabyte and handles data of a matrix formed from 1,024 pixels of 16 bits in a horizontal row and 512 pixels of 16 bits in a vertical column.

The frame memory 56 has a display area in which data are developed as a video output and a color lookup table (CLUT) to be referred to by the memory controller 55 when the memory controller 55 performs plotting of a polygon or the like. The texture memory 54 and the frame memory 56 may otherwise be formed from the same memory divided into a texture area and a CLUT area, and the texture area and the CLUT may be varied dynamically in accordance with a change of the display area or the like when they are used.

A liquid crystal display controller (LCDC) 29 shown in FIG. 3 is connected to the memory controller 55 of the rendering apparatus 50, and the liquid crystal display monitor 36 is connected to the liquid crystal display controller 29. Display data outputted from the memory controller 55 are converted into a video output signal φv by the liquid crystal display controller 29, and the video output signal φv is outputted to the liquid crystal display monitor 36. The liquid crystal display monitor 36 three-dimensionally displays, for example, a game character formed from three-dimensional Bezier curved surfaces.

Referring to FIG. 3, the ROM 45 is connected to the bus 41 of the portable terminal equipment 300 and stores various control procedures and program information of an operating system for managing the main memory 18, sound process unit 44 and so forth. In the portable terminal equipment 300 shown in FIG. 3, a memory cartridge 30 or the like is connected to and used together with an interface 42. The memory cartridge 30 has game data or electronic contents such as electronic animations recorded therein.

The memory cartridge 30 has, for example, a bus 34, to which an interface 31, a mask ROM 32 for readout control and an EEPROM (Electrically Erasable and Programmable Read Only Memory) 33 for recording contents therein are connected. The EEPROM 33 has program information such as game data and video material information recorded therein.

The recorded contents of the memory cartridge 30 are transferred to the main memory 18 through the interface 42 and the bus 41. For example, coordinate values of control points for generation of nth order Bezier curved surfaces or Bezier curves of a game character transferred from the memory cartridge 30 are stored into the main memory 18. The main memory 18 is formed from a random access memory (RAM). The main memory 18 here is a memory on which a program can be executed.

The input controller (INTC) 43 for controlling the Bezier dividing apparatus 17 is connected to the bus 41 described above, and operation buttons 39 are provided for the input controller 43. The operation buttons 39 are operated by a user. If any of the operation buttons 39 is operated, then the input controller 43 generates operation information D3 and inputs the operation information D3 to the CPU 40 through the bus 41. The CPU 40 reads out vertex information Cin from the main memory 18 in response to the operation information D3 and executes such display control as to display a curved figure and vary the curved figure in regard to the vertex information Cin.

The CPU 40 executes the operating system stored in the ROM 45 to control the entire portable terminal equipment 300 and is formed from, for example, an RISCCPU of 32 bits. If power supply to the portable terminal equipment 300 is made available, then the CPU 40 executes the operating system stored in the ROM 45 in accordance with a game mode or a program playback mode to control the Bezier dividing apparatus 17, sound process unit 44 and so forth. Since the CPU 40 performs interrupt control, in order to reduce the control burden to it, a control apparatus for direct memory access (DMA) transfer may be provided separately.

The sound process unit 44 performs playback, amplification and so forth of sound information relating to a game or an electronic animation in accordance with an instruction from the CPU 40, and outputs a sound signal of the sound information to a speaker 37. A sound buffer in which waveform data and so forth are recorded may be provided in the sound process unit 44 so as to generate music sound, effect sound and so forth.

Where a sound buffer is provided, the sound process unit 44 can play back sound data obtained, for example, by adaptive differential PCM (ADPCM) coding of sound data of 16 bits into a differential signal of 4 bits (ADPCM decoding function), play back waveform data stored in the sound buffer to generate effect sound and so forth (playback function) or modulate and play back the waveform data stored in the sound buffer (modulation function) Where such functions as described above are provided, the sound process unit 44 can be used also as a sampling sound source which generates music sound, effect sound and so forth based on the recorded waveform data in accordance with an instruction from the CPU 40.

Figure 9:
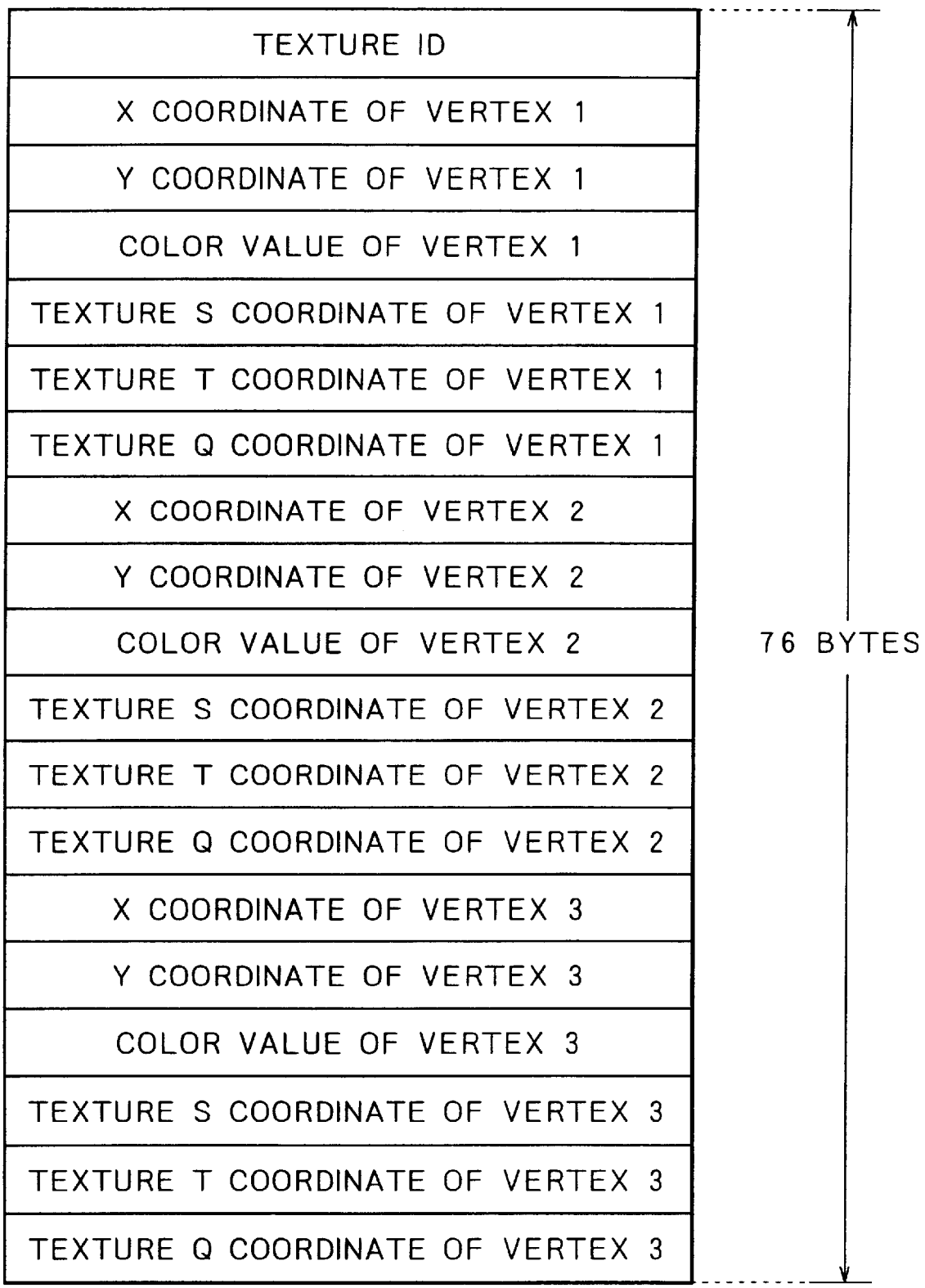
FIG. 9 is a data format illustrating an example of recorded contents of configuration data of a triangle as a polygon.
Figure 10:
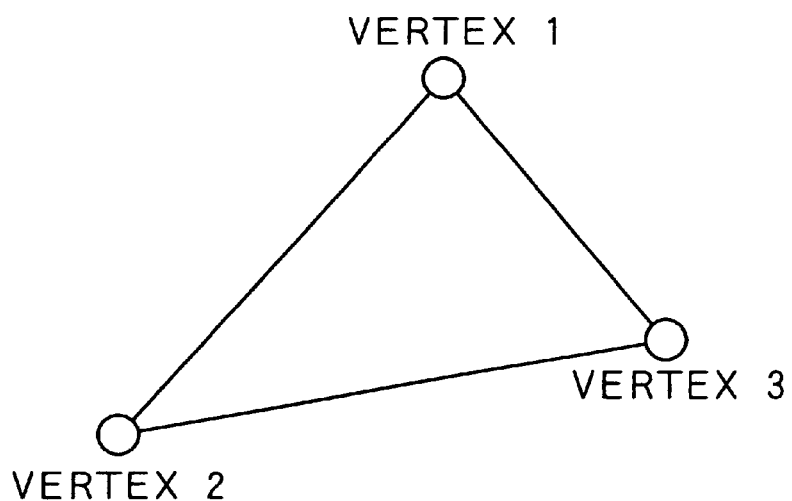
FIG. 10 is a diagrammatic view illustrating an example of a configuration of a triangular polygon.
Figure 11:
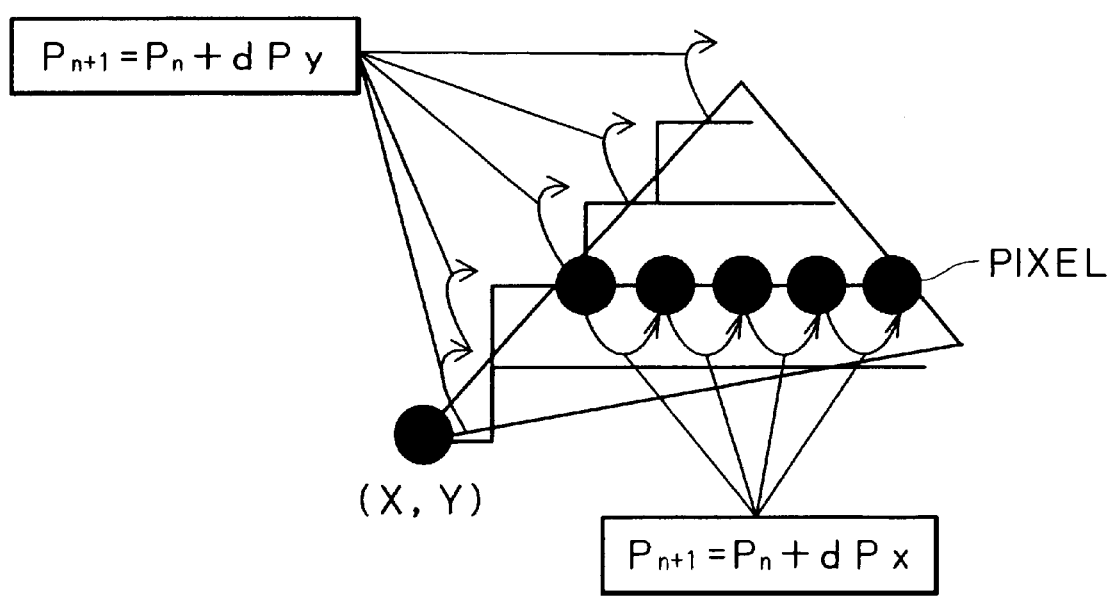
FIG. 11 is a diagrammatic view illustrating an example of arithmetic processing of a parameter.

Now, an example of operation of the portable terminal equipment 300 is described. FIG. 9 shows a data format illustrating an example of recorded contents of configuration data of one polygon (triangle). FIG. 10 shows an example of a configuration of a triangular polygon. FIG. 11 illustrates an example of parameter calculation processing.

The configuration data (vertex information Cin) of one polygon (triangle) shown in FIG. 9 are used to configure configuration data of one polygon of such a triangle as shown in FIG. 10 from 76 bytes. In particular, one polygon is represented as a triangle having three vertexes 1, 2 and 3 shown in FIG. 10, and a texture ID illustrated in FIG. 9 is described at the top of the configuration data. The texture ID is followed by the X and Y coordinates of a first vertex of the triangle and further by a color value and texture S, T and Q coordinates of the first vertex.

Following them, the X and Y coordinates of a second vertex are described, and a color value and texture S, T and Q coordinates of the second vertex are described. Further, the X and Y coordinates of a third vertex are described, and a color value and texture S, T and Q coordinates of the third vertex are described. The vertex information Cin composed of such values as described above is used so as to link the vertexes 1, 2 and 3 of the triangular polygon in response to an operation of the user.

While lighting processing is performed for normal line vectors at the vertexes of the triangle outputted from the Bezier dividing apparatus 17 to be used to represent nth order curved surface figures, the vertex information Cin of the individual triangles is coordinate-converted, and then the vertex information Cin is re-arranged depending upon the software or the hardware, whereafter image processing for line scanning is performed for the re-arranged vertex information Cin.

In particular, the vertex information Cin of the successive vertexes is coordinate-converted for each vertex. The vertex information Cin after the coordinate conversion is subject to linear interpolation calculation based on the coordinate values (X, Y) of the vertex of the triangle shown in FIG. 11, the gradient value dPx of the parameter in the X direction, the gradient value dPy of the parameter in the Y direction and the clock signal CLK. Further, a color texture address (S, T, Q) is calculated for each one pixel. Then, the texture color of the S, T, Q coordinates is read out from the vertex information Cin designated by the texture ID, and the color value of each pixel is determined. Then, a three-dimensional video image is displayed on a liquid crystal display monitor based on such color values.

Figure 12:
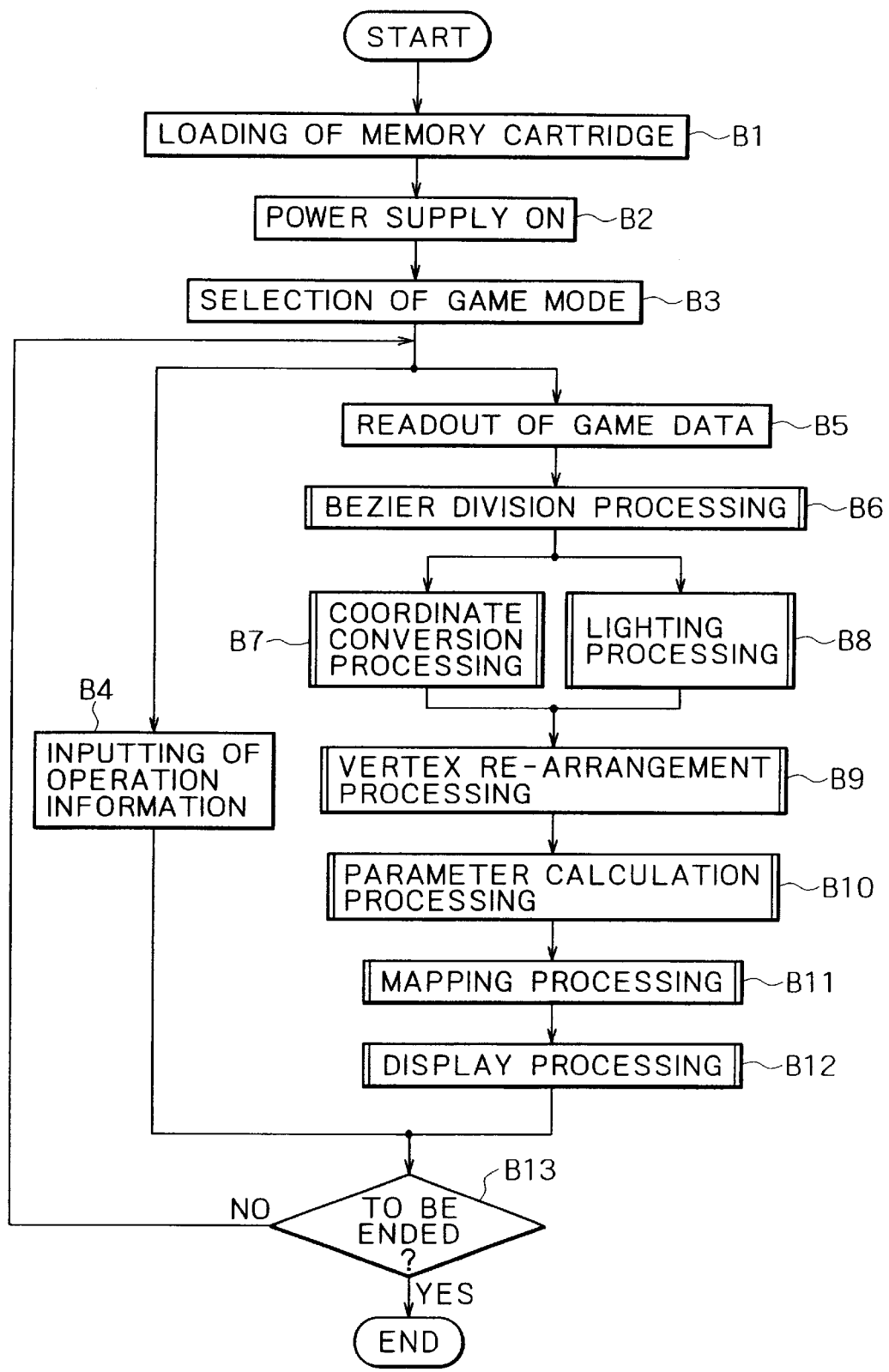
FIG. 12 is a flow chart illustrating an example of processing of the portable terminal unit of FIG. 3.
Figure 13:
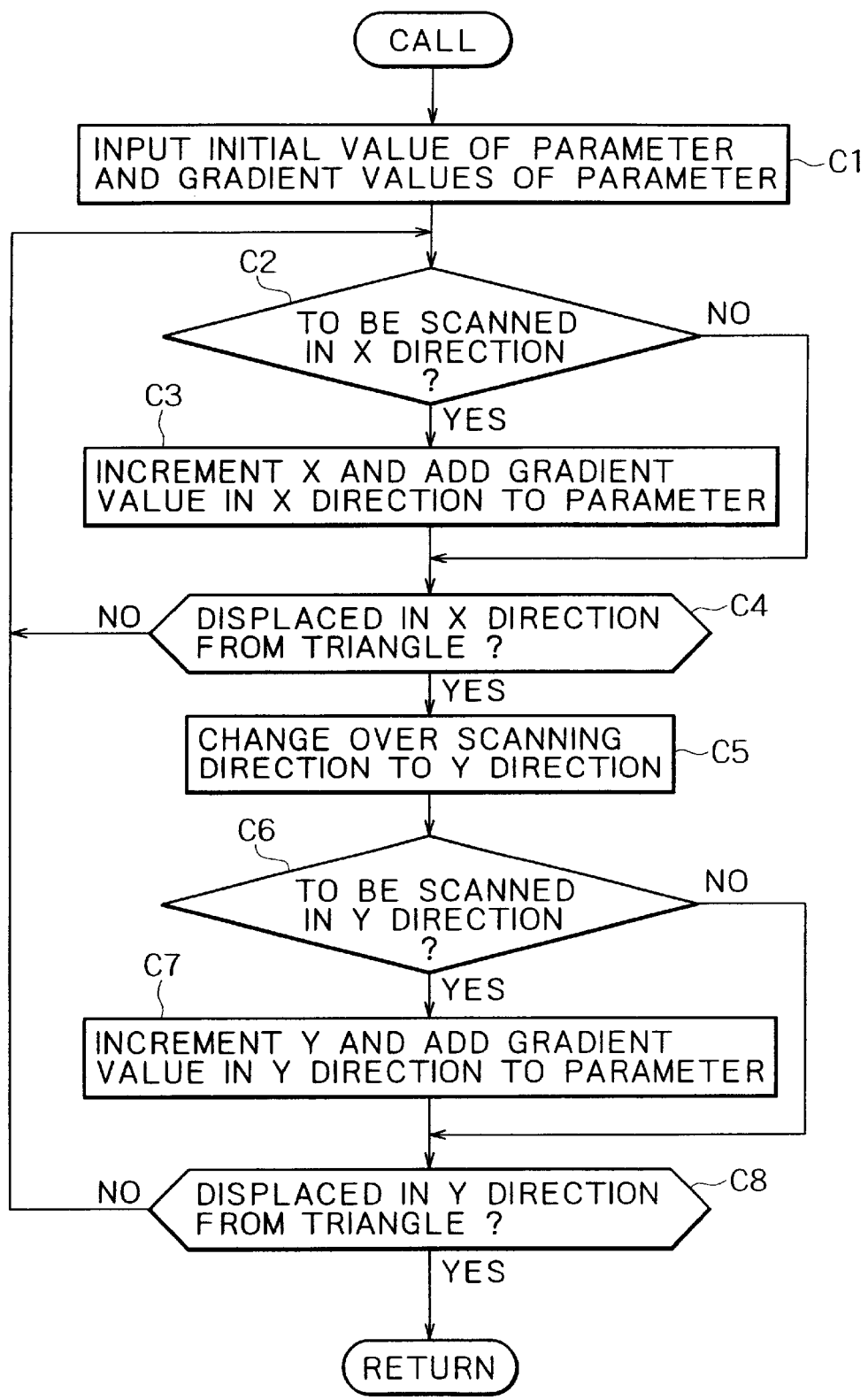
FIG. 13 is a flow chart illustrating an example of parameter operation processing.

FIG. 12 illustrates an example of processing of the portable terminal equipment 300, and FIG. 13 illustrates an example of parameter calculation processing of the portable terminal equipment 300.

It is premised that the portable terminal equipment 300 performs linear interpolation calculation of a parameter of a pixel to be used to plot game character in a three-dimensional video based on the coordinate values (X, Y) of a vertex of a triangle (polygon), the gradient value dPx of the parameter in the X direction, the gradient value dPy of the parameter in the Y direction and the clock signal CLK. Naturally, it is presumed that, in an initial stage, the clock signal CLK is supplied to the parameter calculation section 52.

Referring first to FIG. 12, the user will load the memory cartridge 30 into the portable terminal equipment 300 in step B1 and then connect the power supply to the portable terminal equipment 300 in step B2. When the power supply is connected, the clock supply section 7 begins to generate the clock signal CLK, and the CPU 40 executes the operating system stored in the ROM 45 in response to the clock signal CLK to control the Bezier dividing apparatus 17, sound process unit 44 and so forth. Then, the user will select a game mode in step B3. In order to execute the application in the game mode, the CPU 40 reads out a control procedure from the ROM 45.

Meanwhile, the user will selectively operate the operation buttons 39 in step B4. When one of the operation buttons 39 is operated, corresponding operation information D3 is inputted to the CPU 40 through the input controller 43 and the bus 41. The operation information D3 is used to deform three-dimensional Bezier curved surfaces and/or Bezier curves which form a game character or move the character.

Concurrently with the inputting of the operation information D3, the CPU 40 reads out vertex information Cin from the main memory 18 based on the operation information D3 in steps B5 to B10 and executes such display control as to vary the three-dimensional Bezier curved surfaces and/or Bezier curves with regard to the vertex information Cin.

More particularly, in step B5, game data composed of program information and video material information are read out from the memory cartridge 30 and transferred to the main memory 18. The video material information includes coordinate values of control points to be used to generate three-dimensional Bezier curved surfaces and/or Bezier curves which form the game character.

After the game data are transferred to the main memory 18, the processing advances to step B6, in which the Bezier dividing apparatus 17 graphically processes a three-dimensional curved surface figure based on the coordinate values of the control points read out from the main memory 18 based on the operation information D3. For example, the floating-point linear interpolator of the Bezier dividing apparatus 17 successively calculate X"=X(1−t)+tX' and Yt"=Y(1−t)+tY' with regard to coordinate values of each of new control points which internally divide, based on coordinate values X, Y and X', Y' of control points of the 23-bit width and the interpolation coefficient t of the 8-bit width whose value falls within the range of $0 \leq Y \leq 1$.

Then in step B7, the coordinate conversion section 24 converts coordinate values of a vertex P0 into coordinate values of a screen coordinate (video display) system in accordance with a polygon plotting instruction from the CPU 40. For example, in flat shading, coordinate calculation of approximately 1,500,000 polygons in the maximum is performed for one second.

Concurrently, the lighting processing section 25 arithmetically operates an inner product (cos θ) between a normal vector at the vertex of the triangle and a light source vector set in advance to calculate a light color in accordance with a calculation request from the CPU 40 (light source calculation).

Then, the processing advances to step B9, in which the vertex re-arrangement apparatus 20 writes m pieces of the vertex information Cin obtained by the coordinate conversion successively into a memory area for the first line and then writes next m pieces of the vertex information Cin successively into another memory area for the second line in accordance with a plotting instruction from the CPU 40. Thereafter, the vertex re-arrangement apparatus 20 successively reads outs 2(m−1) pieces of triangle information Cout obtained by obliquely dividing m−1 quadrangles each defined by two pieces of the vertex information Cin which are adjacent each other in the first line and two pieces of the vertex information Cin which are adjacent each other in the second line.

Then, the processing advances to step B10, in which the parameter calculation section 52 performs linear interpolation calculation based on the coordinate values (X, Y) of the vertex of the triangle shown in FIG. 11, the gradient value dPx of the parameter in the X direction, the gradient value dPy of the parameter in the Y direction and the clock signal CLK.

For example, coordinate values (X, Y) of vertexes of a triangle, gradient values dPx of the parameters in the X direction and gradient values dPy of the parameters in the Y direction are inputted to the parameter calculation section 52. Thereafter, different processes are performed separately by the parameter calculation system and the clock control system. The "0" detection circuit 65 detects a particular gradient value of the parameter in the X direction and/or the Y direction. Here, if dPx=0 is detected as the particular gradient value of the parameter in the X direction or/and dPy=0 is detected as the particular gradient value of the parameter in the Y direction, then the clock enabler 66 stops the clock signal CLK.

If the gradient value dPx=0 or/and dPy=0 of the parameter is not detected, then the clock enabler 66 in each of the parameter calculation units 521 to 529 continues supply of the clock signal CLK to the registers 63 and 671 to 674. On the other hand, the parameter calculation section 52 performs parameter calculation processing in response to presence/absence of the clock signal CLK. While the clock signal CLK is supplied (present), linear interpolation processing is performed in accordance with the expressions (1) to (3) given hereinabove.

For example, a subroutine illustrated in FIG. 13 is called, and an initial value of the parameter Pn, a gradient value dPx of the parameter in the X direction and a gradient value dPy of the parameter in the Y direction are inputted in step C1 of the flow chart of FIG. 13. Then, the processing advances to step C2, in which it is discriminated whether or not scanning in the X direction should be performed. If scanning in the X direction should be performed, then the processing advances to step C3, in which X is incremented and the gradient value dPx of the parameter in the X direction is added to the parameter initial value parameter Pn.

When scanning in the X direction should not be performed in step C2 or after the addition of the gradient value dPx of the parameter in step C3, the processing advances to step C4, in which it is detected whether or not the pixel in the triangle is displaced to the outside with respect to the gradient value dPx of the parameter in the X direction using a method well known in the art. If the pixel in the triangle is not displaced to the outside, then the processing returns to step C2 to repeat the addition processing. If the pixel in the triangle is displaced to the outside, then the addition processing in the X direction is stopped, and the scanning direction is changed over from the x direction to the Y direction in step C5. Thereafter, the processing advances to step C6, in which it is discriminated whether or not scanning in the Y direction should be performed. If scanning in the Y direction should be performed, then the processing advances to step C7, in which Y is incremented and the gradient value dPy of the parameter in the Y direction is added to the initial value parameter Pn.

When scanning should not be performed in step C6 or after the addition of the dPy in step C7, the processing advances to step C8, in which it is discriminated whether or not the pixel in the triangle is displaced to the outside with respect to the gradient value dPy of the parameter in the Y direction using a method well known in the art. If the pixel in the triangle is not displaced to the outside, then the processing returns to step C2 to repeat the addition processing. Consequently, scan conversion can be performed while linear interpolation of a color value, texture coordinates and so forth between vertexes is performed.

If the pixel in the triangle is displaced to the outside in step C8, then the addition processing of a pixel in the triangle is stopped, and the processing returns to step B10 of the flow chart shown in FIG. 12. Referring back to FIG. 12, in step B10, linear interpolation calculation result values (hereinafter referred to simply as interpolation values) are outputted.

While the parameter calculation section 52 linearly interpolates many parameters concurrently, depending upon the object of plotting, the Z value or the A (a) value does not vary. Further, in a clearing operation which is performed for each frame, none of the parameters varies. Therefore, stopping of supply of the clock signal CLK according to the present invention is performed frequently.

In particular, for example, if operation information does not change in step B4, then the gradient value dPx of the parameter in the X direction and the gradient value dPy of the parameter in the Y direction are detected frequently by the "0" detection circuit 65, and the clock signal CLK is stopped frequently. In such a case as just described, the parameter calculation section 52 fixedly outputs the interpolation result values same as those immediately before the stopping of the clock signal CLK.

For example, the R parameter calculation unit 521 stops the clock signal CLK and fixedly outputs four values of the red interpolation values R0, R1, R2 and R3 when such a particular gradient value of the parameter as the gradient value dRx of the parameter in the X direction of "0" and/or the gradient value dRy of the parameter in the Y direction of "0" is detected and within a period within which such a value continues to be detected.

Similarly, the G parameter calculation unit 522 stops the clock signal CLK and fixedly outputs four values of the green interpolation values G0, G1, G2 and G3 when such a particular gradient value of the parameter as the gradient value dGx of the parameter in the X direction of "0" and/or the gradient value dGy of the parameter in the Y direction of "0" is detected and within a period within which such a value continues to be detected.

The B parameter calculation unit 523 stops the clock signal CLK and fixedly outputs four values of the blue interpolation values B0, B1, B2 and B3 when such a particular gradient value of the parameter as the gradient value dBx of the parameter in the X direction of "0" and/or the gradient value dBy of the parameter in the Y direction of "0" is detected and within a period within which such a value continues to be detected.

The A parameter calculation unit 524 stops the clock signal CLK and fixedly outputs four values of the transparency interpolation values A0, A1, A2 and A3 when such a particular gradient value of the parameter as the gradient value dAx of the parameter in the X direction of "0" and/or the gradient value dAy of the parameter in the Y direction of "0" is detected and within a period within which such a value continues to be detected.

The Z parameter calculation unit 525 stops the clock signal CLK and fixedly outputs four values of the Z parameter interpolation values Z0, Z1, Z2 and Z3 when such a particular gradient value of the parameter as the gradient value dzx of the parameter in the X direction of "0" and/or the gradient value dzy of the parameter in the Y direction of "0" is detected and within a period within which such a value continues to be detected.

The S parameter calculation unit 526 stops the clock signal CLK and fixedly outputs four values of the S coordinate interpolation values S0, S1, S2 and S3 when such a particular gradient value of the parameter as the gradient value dSx of the parameter in the X direction of "0" and/or the gradient value dSy of the parameter in the Y direction of "0" is detected and within a period within which such a value continues to be detected.

The T parameter calculation unit 527 stops the clock signal CLK and fixedly outputs four values of the T coordinate interpolation values T0, T1, T2 and T3 when such a particular gradient value of the parameter as the gradient value dTx of the parameter in the X direction of "0" and/or the gradient value dTy of the parameter in the Y direction of "0" is detected and within a period within which such a value continues to be detected.

The Q parameter calculation unit 528 stops the clock signal CLK and fixedly outputs four values of the Q coordinate interpolation values Q0, Q1, Q2 and Q3 when such a particular gradient value of the parameter as the gradient value dQx of the parameter in the X direction of "0" and/or the gradient value dQy of the parameter in the Y direction of "0" is detected and within a period within which such a value continues to be detected.

The FOG parameter calculation unit 529 stops the clock signal CLK and fixedly outputs four values of the FOG coefficient interpolation values FOG0, FOG1, FOG2 and FOG3 when such a particular gradient value of the parameter as the gradient value dFx of the parameter in the X direction of "0" and/or the gradient value dFy of the parameter in the Y direction of "0" is detected and within a period within which such a value continues to be detected.

Thereafter, the processing advances to step B11, in which mapping processing is performed. In this processing, when the various interpolation values from the nine parameter calculation units 521 to 529 of the parameter calculation section 52 described hereinabove are inputted, the mapping section 53 reads out the texture color of the S, T, Q coordinates from within the vertex information Cin designated by the texture ID from the texture memory 54, determines the color value of each pixel and adheres the texture color to the polygon.

Then, the processing advances to step B12, in which display data for one screen of the liquid crystal display monitor 36 are written from the mapping section 53 into the frame memory 56. For example, the memory controller 55 performs plotting of approximately 360,000 triangles (polygons) as polygons in the maximum for one second into the frame memory 56 in accordance with a plotting instruction from the CPU 40. Here, when the memory controller 55 performs plotting of polygons and so forth, it refers to the color lookup table or the like to effect video processing. The display data obtained by the video display processing are converted into a video output signal φv by the liquid crystal display controller 29, and the video output signal φv is outputted to the liquid crystal display monitor 36.

The liquid crystal display monitor 36 three-dimensionally displays, for example, a game character composed of three-dimensional Bezier curved surfaces. Sound information relating to the video display processing is played back and amplified by the sound process unit 44 in accordance with an instruction from the CPU 40, and the amplified sound signal is outputted to the speaker 37. Consequently, the user can enjoy the game on the portable terminal equipment 300.

It is to be noted that, when the game comes to an end, the processing advances to step B13, in which the CPU 40 discriminates whether or not the game mode should be ended. If the game mode should be ended, since power supply off information or the like is detected by the CPU 40, such information processing as described above is ended. If the user operates the operation buttons 39 to input an instruction to repeat the game mode to the CPU 40, then the processing returns to steps B4 and B5 so that the processing in steps B4 and B5 to B12 is repeated. Consequently, the user can enjoy the game any number of times on the portable terminal equipment 300.

In this manner, the portable terminal equipment 300 according to the present invention includes the R parameter calculation unit 521, G parameter calculation unit 522, B parameter calculation unit 523, A parameter calculation unit 524, Z parameter calculation unit 525, S parameter calculation unit 526, T parameter calculation unit 527, Q parameter calculation unit 528 and FOG parameter calculation unit 529 which are driven by the battery 5.

Further, the portable terminal equipment 300 can perform such output control that, when such a particular gradient value of the parameter as the gradient value dRx, dGx, dBx, dAx, dZx, dSx, dTx, dQx or dFx of the parameter in the X direction of "0" and/or the gradient value dRy, dGy, dBy, dAy, dZy, dSy, dTy, dQy or dFy of the parameter in the Y direction of "0" is detected by the individual calculation units 521 to 529 and within a period within which such a value continues to be detected, the clock signal CLK is stopped and four values of the red interpolation values R0, R1, R2 and R3, four values of the green interpolation values G0, G1, G2 and G3, four values of the blue interpolation values B0, B1, B2 and B3, four values of the transparency interpolation values A0, A1, A2 and A3, four values of the Z value interpolation values Z0, Z1, Z2 and Z3, four values of the S coordinate interpolation values S0, S1, S2 and S3, four values of the T coordinate interpolation values T0, T1, T2 and T3, four values of the Q coordinate interpolation values Q0, Q1, Q2 and Q3 and four values of the FOG coefficient interpolation values FOG0, FOG1, FOG2 and FOG3 are fixed individually.

Accordingly, since the power consumption can be reduced without degrading the plotting capacity for a three-dimensional video, the life of the battery 5 for the portable terminal equipment 300 can be extended, or a battery of a lower capacity can be used for the battery 5 if the life is equal, and the portable terminal equipment 300 which applies computer graphics can achieve a higher value.

Further, since the power consumption by charging and discharging of clock wiring lines from the clock enabler 66 to the registers 63 and 671 to 674 in each of the parameter calculation units 521 to 529 can be reduced, also heat generation of an IC chip in which the parameter calculation section 52 (graphics system) is incorporated can be reduced.

Accordingly, such a part as a fan can be eliminated or a part of a lower quality can be used, and besides a less expensive IC package can be used and this acts to suppress the price of the product. This is effective when a 3DCG (three-dimensional computer graphics) application is implemented with a mobile (mobile or portable terminal) apparatus and contributes significantly, for example, to provision of a portable telephone set or the like with a video game function wherein an arbitrary game character is plotted in a three-dimensional video.

While a preferred embodiment of the present invention has been described using specific terms, such description is for illustrative purposes only, and it is to be understood that changes and variations may be made without departing from the spirit or scope of the following claims.

What is claimed is:

1. An arithmetic unit for linearly interpolating a parameter of a pixel to be used to plot an arbitrary object in a three-dimensional video based on coordinate values of a vertex of a polygon and gradient values of the parameters in an X direction and a Y direction, comprising:

arithmetic operation means for linearly interpolating a parameter of a pixel in a polygon based on coordinate values of a vertex of the polygon, a gradient value of the parameter in an X direction and a gradient value of the parameter in a Y direction;

clock supply means for supplying a clock signal to said arithmetic operation means;

detection means for detecting a particular gradient value of the parameter in the X direction or/and the Y direction to produce a parameter gradient value detection signal; and control means for receiving the parameter gradient value detection signal from said detection means and controlling said clock supply means in response to the parameter gradient value detection signal.

2. An arithmetic unit according to claim 1, wherein said arithmetic operation means calculates $$P(X,Y)=dP/dX(X-X_0)+dP/dY(Y-Y_0)+P_0$$

where P(X, Y) is the parameter of a pixel to be used to plot the three-dimensional video, $X_0$ and $Y_0$ are the coordinate values of the vertex of the polygon, $P_0$ is the parameter at the point of the vertex, dP/dX is the gradient value of the parameter in the X direction on the polygon, and dP/dY is the gradient value of the parameter in the Y direction on the polygon.

3. An arithmetic unit according to claim 1, wherein, where the parameter of a pixel in the polygon is represented by Pn and the variation amount of the parameter in the X direction is represented by dPx while the variation amount of the parameter in the Y direction is represented by dPy, said arithmetic operation means successively calculates Pn+1=Pn+dPx for the X direction and Pn+1=Pn+dPy for the Y direction.

4. An arithmetic unit according to claim 1, wherein said control means stops the supply of the clock signal to said arithmetic operation means when "0" is detected as the gradient value of the parameter in the X direction or/and as the gradient value of the parameter in the Y direction.

5. An arithmetic unit according to claim 1, wherein said arithmetic operation means, clock supply means, detection means and control means are driven by a battery.

6. An arithmetic unit according to claim 1, wherein at least part or the entirety of said arithmetic operation means, said detection means and said control means are formed as a unit arithmetic unit, said unit arithmetic unit is provided for each parameter of a pixel.

7. An arithmetic processing method wherein a parameter of a pixel to be used to plot an arbitrary object in a three-dimensional video is calculated by linear interpolation calculation based on coordinate values of a vertex of a polygon, a gradient value of the parameter in an X direction, a gradient value of the parameter in a Y direction and a clock signal, comprising the steps of:

detecting a particular gradient value of the parameter in the X direction or/and the Y direction; and stopping, when the particular gradient value of the parameter is detected, supply of the clock signal thereby to fix an output value relating to the linear interpolation calculation.

8. An arithmetic processing method according to claim 7, wherein the linear interpolation calculation is performed in accordance with $$P(X,Y)=dP/dX(X-X_0)+dP/dY(Y-Y_0)+P_0$$

where P(X, Y) is the parameter of a pixel to be used to plot the three-dimensional video, $X_0$ and $Y_0$ are the coordinate values of the vertex of the polygon, $P_0$ is the parameter at the point of the vertex, dP/dX is the gradient value of the parameter in the X direction on the polygon, and dP/dY is the gradient value of the parameter in the Y direction on the polygon.

9. An arithmetic processing method according to claim 8, wherein, where the parameter of the vertex of the polygon is represented by Pn and the parameter of a pixel in the polygon is represented by Pn+1, Pn+1=Pn+dPx is calculated for the X direction and Pn+1=Pn+dPy is calculated for the Y direction.

10. An arithmetic processing method according to claim 7, wherein the output value relating to the linear interpolation calculation is fixed when "0" is detected as the gradient value of the parameter in the X direction and/or as the gradient value of the parameter in the Y direction.

* * * * *

UNITED STATES PATENT AND TRADEMARK OFFICE
CERTIFICATE OF CORRECTION

PATENT NO. : 6,720,974 B2
DATED : April 13, 2004
INVENTOR(S) : Shigeatsu Yoshioka et al.

It is certified that error appears in the above-identified patent and that said Letters Patent is hereby corrected as shown below:

Column 14,
Line 13, change "Yt" to -- Y --;
Line 18, change " $0 \leqq Y \leqq 1$" to -- $0 \leqq t \leqq 1$ --;

Column 15,
Line 59, change "A(a)" to -- A($\alpha$) --.

Signed and Sealed this

Tenth Day of August, 2004

JON W. DUDAS
*Acting Director of the United States Patent and Trademark Office*